US012697612B2

(12) United States Patent
D'Apuzzo et al.

(10) Patent No.: US 12,697,612 B2
(45) Date of Patent: Aug. 4, 2026

(54) MICROFLUIDIC SENSING

(71) Applicant: Hewlett-Packard Development Company, L.P., Spring, TX (US)

(72) Inventors: Fausto D'Apuzzo, Palo Alto, CA (US); Viktor Shkolnikov, Palo Alto, CA (US); Alexander N. Govyadinov, Corvallis, OR (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 787 days.

(21) Appl. No.: 18/012,219

(22) PCT Filed: Jul. 7, 2020

(86) PCT No.: PCT/US2020/041081
§ 371 (c)(1),
(2) Date: Dec. 21, 2022

(87) PCT Pub. No.: WO2022/010461
PCT Pub. Date: Jan. 13, 2022

(65) Prior Publication Data
US 2023/0234052 A1 Jul. 27, 2023

(51) Int. Cl.
*B01L 3/00* (2006.01)

(52) U.S. Cl.
CPC . *B01L 3/502715* (2013.01); *B01L 2300/0636* (2013.01); *B01L 2300/0654* (2013.01); *B01L 2300/0877* (2013.01); *B01L 2300/168* (2013.01)

(58) Field of Classification Search
CPC ....... B01L 3/502715; B01L 2300/0636; B01L 2300/0654; B01L 2300/0877; B01L 2300/168; G01N 15/147; G01N 2015/144; G01N 21/6456; G01N 2021/6482
USPC .................................................. 422/502, 500
See application file for complete search history.

(56) References Cited

U.S. PATENT DOCUMENTS

| | | | | |
|---|---|---|---|---|
| 7,110,789 | B1 | 9/2006 | Curtiss et al. | |
| 7,820,428 | B2 | 10/2010 | Tysoe et al. | |
| 9,167,064 | B2 | 10/2015 | Elter et al. | |
| 9,268,466 | B2 | 2/2016 | Momchilov et al. | |
| 9,794,661 | B2 * | 10/2017 | Watson | H04R 17/02 |
| 2012/0302288 | A1 | 11/2012 | Born et al. | |
| 2015/0016417 | A1 | 1/2015 | Dees et al. | |
| 2018/0045562 | A1 | 2/2018 | Santori et al. | |
| 2018/0311661 | A1 | 11/2018 | Inoue et al. | |
| 2019/0153511 | A1 | 5/2019 | Unger et al. | |
| 2019/0388887 | A1 | 12/2019 | Le Berre | |
| 2020/0018684 | A1 * | 1/2020 | Vercruysse | G01N 15/1436 |

FOREIGN PATENT DOCUMENTS

| | | | |
|---|---|---|---|
| CN | 105264358 | A | 1/2016 |
| EP | 3501651 | A1 | 6/2019 |
| WO | 2014/127372 | A2 | 8/2014 |
| WO | 2020/019809 | A1 | 1/2020 |

* cited by examiner

*Primary Examiner* — Christine T Mui
(74) *Attorney, Agent, or Firm* — FOLEY & LARDNER LLP

(57) ABSTRACT

A microfluidic sensing assembly may include a first structure supporting a sensor array, a second structure joined to the first structure and forming a microfluidic passage and a flat lens to focus light, following reflection of the light back and forth across the microfluidic passage, from the microfluidic passage onto the sensor array.

11 Claims, 5 Drawing Sheets

MICROFLUIDIC SENSING

CROSS-REFERENCE TO RELATED APPLICATIONS

This application is a U.S. National Stage Application of PCT/US2020/041081, filed Jul. 7, 2020, which is hereby incorporated by reference in its entirety.

BACKGROUND

Optical fluid interrogation or optical sensing may be used in a variety of applications to identify and analyze fluid compositions and to monitor or evaluate chemical and biological reactions and processes.

Figure 1:
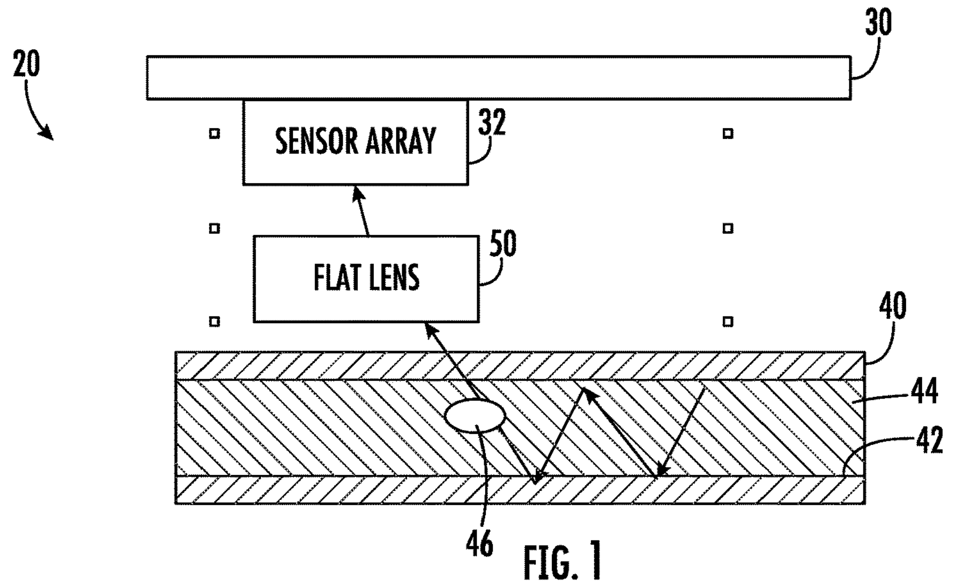
FIG. 1 is a sectional view schematically illustrated portions of an example microfluidic sensing assembly.

Throughout the drawings, identical reference numbers designate similar, but not necessarily identical, elements. The FIGS. are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example microfluidic sensing assemblies and units that facilitate the optical interrogation of small quantities of fluid for carrying out imaging, fluorimetry, spectrometry and other interrogation procedures. For example, the disclosed microfluidic sensing assemblies and units may be beneficial with respect to polymerase chain reaction (PCR) while providing portability and high throughput. The disclosed microfluidic sensing assemblies and units may be useful in cytometry devices for cell populations, infections, cancer biopsies and/or antimicrobial susceptibility tests. The disclosed microfluidic sensing assemblies and units may be beneficial in the monitoring of chemical reactions and fluorescence for decentralized medical diagnostics.

In contrast to many existing optical interrogation systems which may be bulky and expensive due to the use of large, heavy and expensive optics along with distinct and remote sensors, the example microfluidic sensing assemblies and units facilitate the integration of a microfluidic passage carrying the fluid being interrogated, a sensing array for interrogating the fluid within the microfluidic passage and optics for directing light into the microfluidic passage and focusing light exiting the microfluidic passage onto the sensing array. Such integration reduces weight, reduces cost and increases portability. The example microfluidic sensing assemblies and units reflect supplied light back-and-forth across the microfluidic passage, providing enhanced lighting of fluid constituents for enhanced interrogation.

The example microfluidic sensing assemblies comprise two structures joined to one another, the first structure supporting a sensor array and a second structure forming a microfluidic passage. A flat lens is disposed between the microfluidic passage and the sensor array to focus light, following reflection of the light back-and-forth across a microfluidic passage, from the microfluidic passage onto the sensor array. Because the two structures are joined or assembled to one another, the assemblies provide high degrees of alignment between the sensor array, the flat lens and the microfluidic passage containing the fluid being interrogated.

The flat lens facilitates a compact integrated assembly. In some implementation, the flat lens is carried by the first structure. In other implementations, the flat lens is carried by the second structure forming the microfluidic passage. In some implementations, the first structure and the second structure are layers or components that are part of a single microfluidic chip. In some implementations, the first structure may itself comprise a first microfluidic chip, where the second structure comprises a second microfluidic chip joined to the first microfluidic chip.

In some implementations, a light coupler, such as an optical grating, is utilized to supply light, from a light source or ambient light, into the microfluidic passage for reflection. In such examples, the light coupler may be carried by the first structure or may be carried by the second structure. In some implementations, light coupler and the flat lens are formed upon the same layer, facilitating less complex and lower-cost fabrication. In some implementations, light coupler and the flat lens are coplanar, further facilitating lower-cost patterning of such optics.

In some implementations, internal optical reflection along the microfluidic passage is facilitated by total internal reflection due to refractive index transitions at material interfaces. In some implementations, selected surfaces of the second structures forming the microfluidic passage may be coated or formed with a reflective material. In some implementations, selected surfaces of the second structures forming the microfluidic passage may be provided with partially transmissive, partially reflective materials or coatings that reflect or transmit desired wavelengths or light at desired angles such as dichroic coatings or nanostructured coatings (like anti-reflection coatings, reflective coatings). In some implementations, the microfluidic passage or portions of the second structure forming the microfluidic passage may be formed from materials or have geometries that otherwise result in the microfluidic passage functioning as a light pipe for transmitting and internally reflecting supplied light. Light exiting the microfluidic passage is focused by the flat lens onto the sensor array.

Disclosed is an example microfluidic sensing assembly that may include a first structure supporting a sensor array, a second structure joined to the first structure and forming a microfluidic passage and a flat lens to focus light, following reflection of the light back and forth across the microfluidic passage, from the microfluidic passage onto the sensor array.

Disclosed is an example microfluidic sensing method. The method may include directing a fluid through a microfluidic passage of a first structure and reflecting light back and forth across the microfluidic passage through a flat lens to a sensor array supported by a second structure joined to the first structure.

Disclosed is an example sensing unit. The example sensing unit may include a structure having an interface for releasable connection to a second structure having a microfluidic passage, a sensor array supported by the structure, a light coupler supported by the structure for directing light into the microfluidic passage and a flat lens supported by the structure to focus light, following reflection of the light back and forth across the microfluidic passage, from the microfluidic passage onto the sensor array.

As will be appreciated, portions of the disclosed microfluidic assemblies and units may be formed by performing various microfabrication and/or micromachining processes on a substrate to form and/or connect structures and/or components. Microfluidic channels and/or chambers may be formed by performing etching, microfabrication processes (e.g., photolithography), or micromachining processes in a substrate. Accordingly, microfluidic channels and/or chambers may be defined by surfaces fabricated in the substrate of a microfluidic device. In some implementations, microfluidic channels and/or chambers may be formed by an overall package, wherein multiple connected package components combine to form or define the microfluidic channel and/or chamber.

In some examples described herein, a dimension or multiple dimensions of a microfluidic channel, passage and/or capillary chamber may be of sufficiently small size (e.g., of nanometer sized scale, micrometer sized scale, millimeter sized scale, etc.) to facilitate pumping of small volumes of fluid (e.g., picoliter scale, nanoliter scale, microliter scale, milliliter scale, etc.). For example, some microfluidic channels or passages may facilitate capillary pumping due to capillary force. In addition, examples may couple two or more microfluidic channels or passages to a microfluidic output channel via a fluid junction.

FIG. 1 is a sectional view schematically illustrating portions of an example microfluidic sensing assembly 20. Microfluidic sensing assembly 20 comprises a first structure 30 supporting a sensor array 32, a second structure 40 forming a microfluidic passage 42 and a flat lens 50. First structure 30 comprises a layer of material upon which sensor 32 is supported or disposed. First structure 30 may be a layer of a microfluidic chip or die or may itself constitute a microfluidic chip or die. In some implementations, structure 30 may comprise a glass reinforced epoxy laminate material such as a glass epoxy laminate such as FR4. In some implementations, structure 30 may be formed from a variety of material such as silicon, glass, ceramics, polymers or the like.

Sensor array 32 comprises an array of sensors from outputting electrical signals in response to and based light impinging sensor array 32. Sensor array 32 may be utilized for spectrometry or imaging. In some implementations, sensor array 32 comprises a two-dimensional array of imaging elements, each element outputting electrical signals based upon and in response to the impingement of light upon such elements. In some implementations, each of the imaging or sensing elements of sensor array 32 may each comprise a complementary metal-oxide-semiconductor (CMOS), a charge coupled device (CCD) sensor element, a photodiode (PiN), photo-resistive sensor element or other types of a sensing element.

As schematically indicated by two vertical series of ellipses, second structure 40 is joined, directly or indirectly, to structure 30. In some implementations, structure 40 is laminated, bonded, adhered or otherwise permanently affixed to structure 30 and its supported sensor array 32. In some implementations, structure 40 is releasably or removably joined to structure 30 and its supported sensor array 32. For purposes of this disclosure, the term “releasably” or “removably” with respect to an attachment or coupling of two structures means that the two structures may be repeatedly connected and disconnected to and from one another without material damage to either of the two structures or their functioning. As will be described hereafter, in some implementations, structure 40 and structure 30 may releasably connect to one another by a connection interface which guides and locates structures 30 and 32 into connection and alignment.

Microfluidic passage 42 extends within structure 40 and contains fluid 44 containing an analyte 46 of interest. As shown by FIG. 1, portions of structure 40 are formed from a material that facilitates the transmission of light through structure 40 to flat lens 50. At the same time, portions of structure 40 are formed from a material or materials and/or has a geometry such that microfluidic passage 42 functions as a light pipe, wherein light supplied to the interior of microfluidic passage 42 reflects back and forth across microfluidic passage 42 until exiting towards flat lens 50.

In some implementations, light is retained within the interior of microfluidic passage 42, being reflected from interior internal surfaces of microfluidic passage 42. In some implementations, light exits microfluidic passage 42, passing through transmissive portions of structure 40 prior to being reflected into the interior of microfluidic passage 42. In some implementations, such internal optical reflection along the microfluidic passage 42 is facilitated by optical refraction along material interfaces, due to the different indices of refraction of the materials along such an interface. In some implementations, selected surfaces of structure 40 forming the microfluidic passage 42 may be coated or formed with a reflective material, such as aluminum, gold, silver, or made of multi-layers of metal oxides to form dichroic filters. Metal oxides might include oxides of aluminum, titanium, silica, magnesium, zirconium, chromium, or other elements or combination with gold, silver and other reflective thin film metals. For example, in some examples, interior surfaces of microfluidic passage 42 may be coated with a reflective material. In some examples, surfaces of structure 40 spaced from the interior of microfluidic passage 42 by a light transmissive layer or multiple light transmissive layers may be coated with a reflective material. In some implementations, selected surfaces of the second structures forming the microfluidic passage may be provided with partially transmissive, partially reflective materials, facilitating the transmission of light into a fluid passage 42, yet maintaining light within microfluidic passage 42 until being discharged or exiting towards flat lens 50.

Flat lens 50 is located between microfluidic passage 42 and sensor array 32. Flat lens 50 is joined to structures 30 and 40. Flat lens 50 is located to focus light, following reflection of the light back and forth across microfluidic passage 42, from the microfluidic passage 42 onto sensor array 32. In some implementations, flat lens 50 is part of or formed upon structure 40 prior to structure 40 being joined to structure 30. In some implementations, flat lens 50 is formed as part of or upon structure 30 prior to structure 30 being joined to structure 40. Examples of flat lens 50 include, but are not limited to, Fresnel lenses, zone plate lenses and meta-lenses. Such lenses may be replaced by an amplitude mask for computational imaging.

Because the two structures 30, 40, along with sensor array 32 and microfluidic passage 42 are joined or assembled to one another, the assemblies provide high degrees of alignment between the sensor array, the flat lens and the microfluidic passage containing the fluid being interrogated. Because flat lens 50 may be patterned directly onto structure 40 or structure 30, flat lens 50 may be directly aligned with sensor array 32 or microfluidic passage 42. As a result, heavy or large stiffening structures that might otherwise be used for such alignment may be reduced or eliminated, reducing the size and weight of assembly 20 such that assembly 20 may be part of a portable system.

Figure 2:
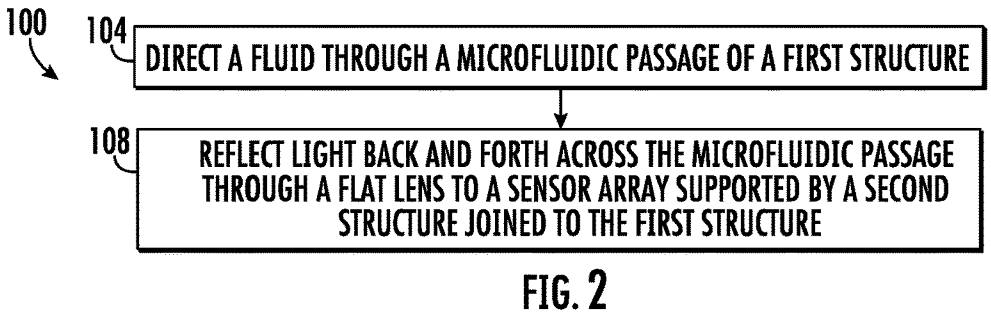
FIG. 2 is a flow diagram of an example microfluidic sensing method.

FIG. 2 is a flow diagram of an example microfluidic sensing method 100. Method 100 facilitates lower-cost interrogation of fluids directed through or contained within a microfluidic passage. As indicated by block 104, a fluid is directed through a microfluidic passage of a first structure, such as through microfluidic passage 42 of structure 40 described above.

As indicated by block 108, light is reflected back and forth across the microfluidic passage through a flat lens to a sensor array supported by second structure which is joined to the first structure. In the example shown in FIG. 1, light is reflected back and forth across microfluidic passage 42, through flat lens 50, to sensor array 32 which is supported by structure 30 which is joined to the structure 40 providing the microfluidic passage 42.

Figure 3:
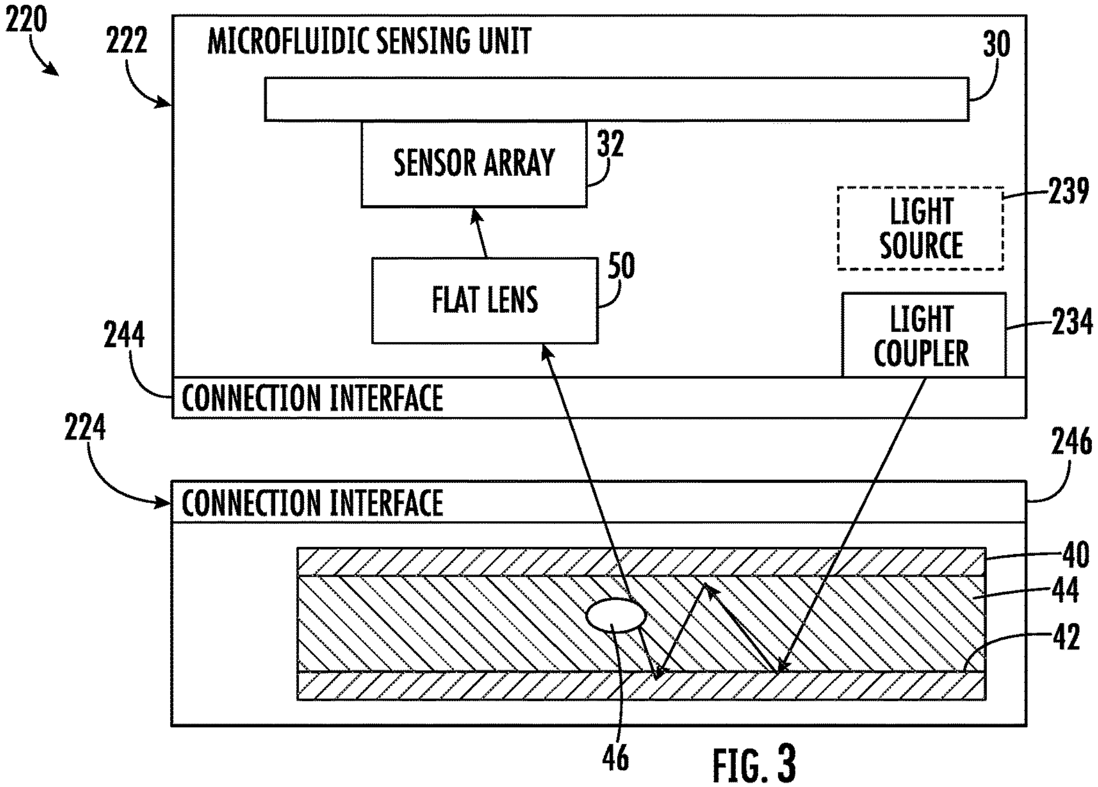
FIG. 3 is a sectional view schematically illustrating portions of an example microfluidic sensing assembly.

FIG. 3 is a sectional view schematically illustrating portions of an example microfluidic sensing assembly 220. FIG. 3 illustrates how a microfluidic sensing assembly may be formed from two separate units which are releasably connected to one another by corresponding connection interfaces. For example, a first one of the units may contain more expensive components, such as a sensor array, and may be reusable, while a second one of the units may contain the microfluidic passage which directly contacts the sample being analyzed, wherein the second of the units may be in the form of a disposable consumable. Microfluidic sensing assembly 220 comprises sensing unit 222 and microfluidic unit 224. Sensing unit 222 comprises a sensing component or module which comprises structure 30, sensor array 32 and flat lens 50 described above. Sensing unit 222 additionally comprises light coupler 234 and connection interface 244.

Light coupler 234 directs light from sensing unit 222 into the microfluidic passage 42 of microfluidic unit 224. In some implementations, sensing unit 222 may additionally comprise a light source 239 (shown in broken lines), wherein light coupler 234 transmits the light from the light source 239 towards and into microfluidic passage 42. In some implementations, light coupler 234 comprises an optical grating. In other implementations, light coupler 234 comprises other structures which facilitate or enhance optical transmission of light through and between the interfaces of the materials forming sensing unit 222 and microfluidic unit 224.

Microfluidic unit 224 comprises a component or module which comprises structure 40 and microfluidic passage 42 described above. Microfluidic unit 224 additionally comprises connection interface 246. Connection interface 246 cooperates with connection interface 244 to releasably connect and join sensing unit 222 to microfluidic unit 224 with microfluidic passage 42 aligned with light coupler 234 for the transmission of light into microfluidic passage 42 and further aligned with flat lens 50 such that flat lens 50 may receive the light that has been reflected back-and-forth across the microfluidic passage 42 or scattered by the particle, cell or other analyte 46 or the fluid itself, and may focus light onto sensor array 32.

Figure 4A:
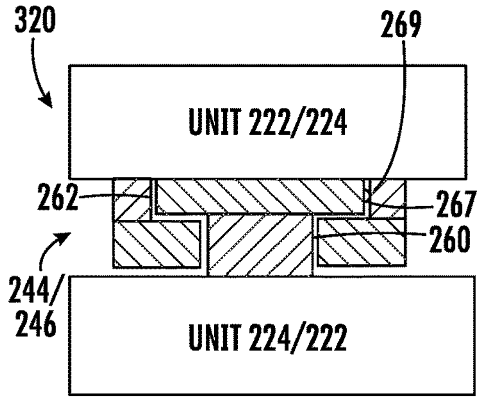
FIG. 4A and FIG. 4B are sectional views schematically illustrating portions of an example microfluidic sensing assembly.
Figure 4B:
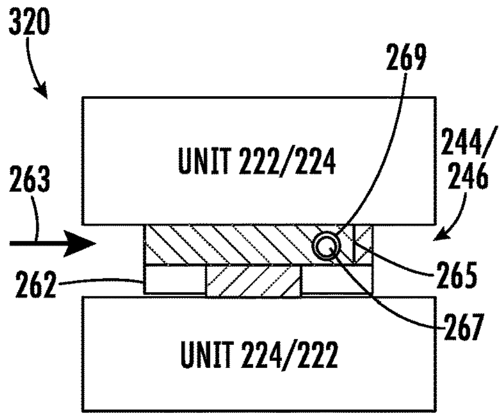

FIGS. 4A and 4B schematically illustrate microfluidic sensing assembly 320. Microfluidic sensing assembly 320 assembly is similar to microfluidic sensing assembly 220 except that microfluidic sensing assembly 320 comprises one example of connection interfaces 244, 246. In the example illustrated, one of the connection interfaces 244, 246 comprises a tongue 260, such as a T-shape tongue, which is slidably received within a corresponding groove or groove 262. As shown by FIG. 4B, tongue 260 may be slid into groove 262 (in the direction indicated by arrow 263) until an aligned state between microfluidic passage 42 and light coupler 234, flat lens 50 is achieved. Such alignment may be indicated by tongue 60 being slid into contact with a blind hole or dead-end 265 of groove 262. In the example illustrated, such aligned status is further tactically indicated by projection 267 of tongue 260 being resiliently popped into a corresponding detent 269. In other implementations, other alignment indicators may be utilized. Upon completion of such testing, microfluidic interface 224 may be removed from sensing unit 222 and a new microfluidic unit 224 may be joined to sensing unit 222 for analysis or sensing of a different fluid within a different microfluidic passage.

Figure 5:
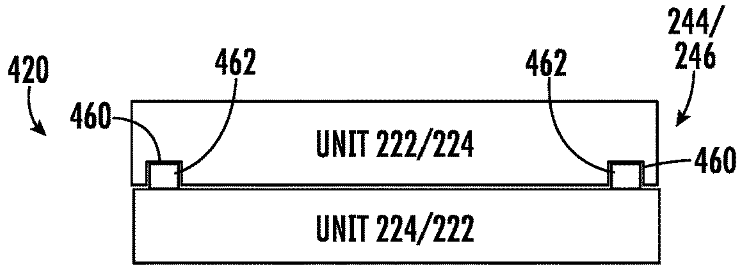
FIG. 5 is a sectional view schematically illustrating portions of an example microfluidic sensing assembly.

FIG. 5 schematically illustrates microfluidic sensing assembly 420. Microfluidic sensing assembly 420 is similar to microfluidic sensing assembly 220 except the microfluidic sensing assembly 420 comprises one example of connection interfaces 244 and 246. In the example shown in FIG. 5, one of connection interfaces 244/246 comprises detents 460 which removably receive alignment pins 462. Insertion of pins 462 into detents 460 provides alignment of microfluidic passage 42 relative to light coupler 234 and flat lens 50. Upon completion of such testing, pins 462 may be withdrawn from detents 460, resulting in microfluidic unit 224 being removed from sensing unit 222. Upon removal of a used microfluidic unit 224, a new microfluidic unit 224 may be joined to sensing unit 222 for analysis or sensing of a different sample within a different microfluidic passage. In other implementations, connection interfaces 244, 246 may comprise other mechanisms for joining and aligning units 222 and 224. For example, connection interface 244, 246 may comprise resilient structures that facilitate releasable snapping of units 222 and 224 to one another in an aligned state.

Figure 6:
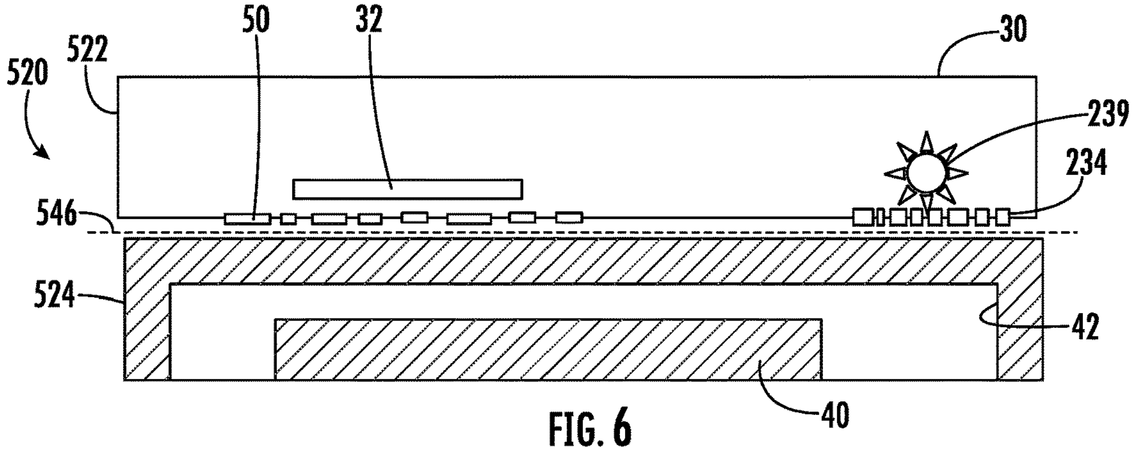
FIG. 6 is a sectional view schematically illustrating portions of an example microfluidic sensing assembly.

FIG. 6 is a sectional view schematically illustrating portions of an example microfluidic sensing assembly 520. FIG. 6 illustrates an example of how a sensing unit may integrate a sensor rate, light coupler, light source and flat lens for less complex and lower cost fabrication.

Assembly 520 comprises sensing unit 522 and microfluidic unit 524 joined by connection interface 546. Sensing unit 522 comprises structure 30 supporting sensing array 32, light coupler 234, light source 239 and flat lens 50 (each of which is described above). Microfluidic unit 524 comprises structure 40 forming microfluidic passage 42.

As shown by FIG. 6, light coupler 239 and flat lens 50 are supported by a same layer, facilitating less complex and lower-cost fabrication. In the example illustrated, light coupler 239 and the flat lens 50 are coplanar, further facilitating lower-cost patterning of such lenses. In other implementations, light coupler 239 and flat lens 50 may be supported by different layers all being coplanar, may be supported on a single layer while not being coplanar or may be formed on different layers while not being coplanar.

Connection interface 546 (schematically illustrated by broken lines) joins units 522 and 524 as a single aligned assembly. In some implementations, connection interface 546 comprises an adhesive, weld or other affixing material. In some implementations, connection interface 546 releasably joins units 522 and 524. For example, in some implementations, connection interface 546 may be in the form of the connection interfaces shown in FIGS. 4A and 4B or that shown in FIG. 5. In yet other implementations, connection interface 546 may comprise other mechanisms for releasably joining units 522, 524, such as resilient hooks, snaps, fasteners and the like.

Figure 7:
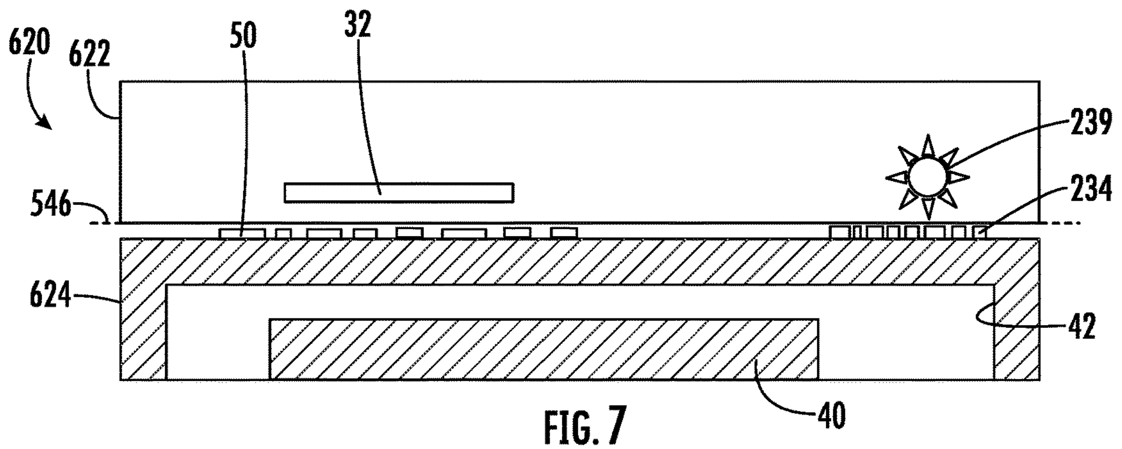
FIG. 7 is a sectional view schematically illustrating portions of an example microfluidic sensing assembly.

FIG. 7 is a sectional view schematically illustrating portions of an example microfluidic sensing assembly 620. FIG. 7 illustrates an example of how a sensing unit may integrate a sensor array and light source and how a microfluidic unit may integrate microfluidic passage, light coupler and flat lens, wherein the two units are joined to one another for compactness, alignment and portability.

Assembly 620 comprises sensing unit 622 and microfluidic unit 624 joined by connection interface 546 (described above). Sensing unit 622 comprises structure 30 supporting sensing array 32, and light source 239. Microfluidic unit 524 comprises structure 40 forming microfluidic passage 42, light coupler 239 and flat lens 50 (each of which is described above).

As shown by FIG. 7, light coupler 239 and flat lens 50 are supported by a same layer of microfluidic unit 624, facilitating less complex and lower-cost fabrication. In the example illustrated, light coupler 239 and the flat lens 50 are coplanar, further facilitating lower-cost patterning of such lenses. In other implementations, light coupler 239 and flat lens 50 may be supported by different layers all of which are coplanar, may be supported on a single layer while not being coplanar or may be formed on different layers while not being coplanar.

Figure 8A:
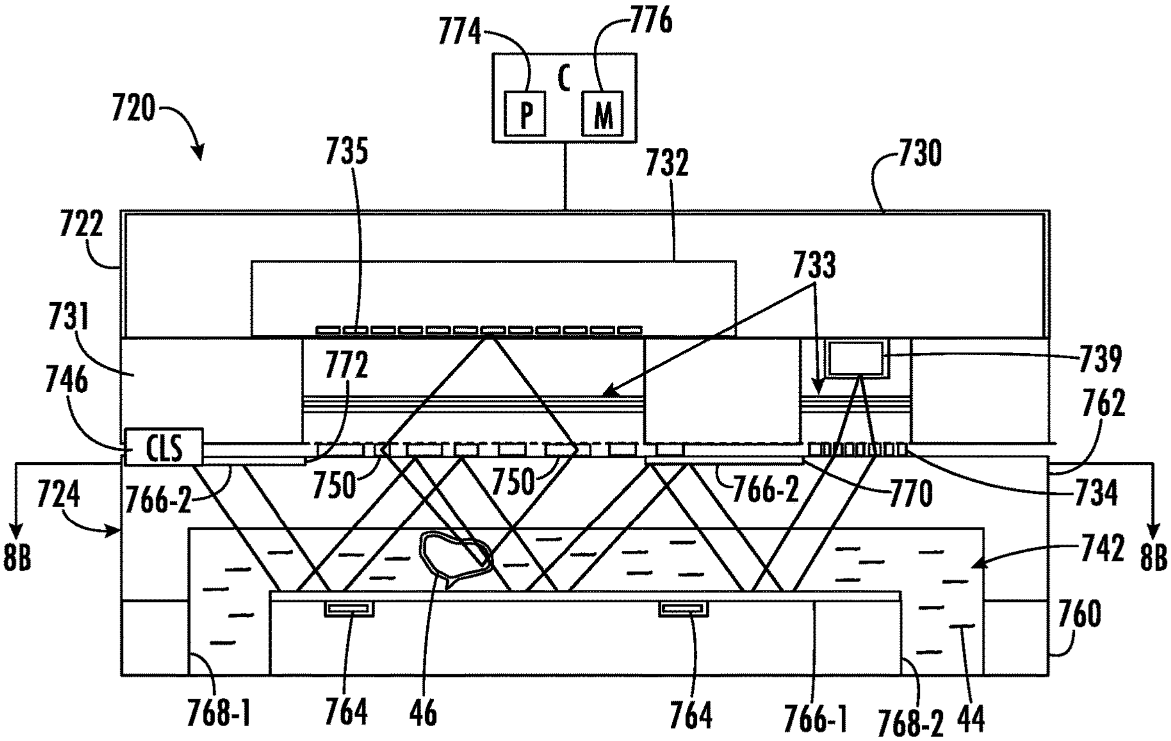
FIG. 8A is a sectional view schematically illustrating portions of an example microfluidic sensing assembly.
Figure 8B:
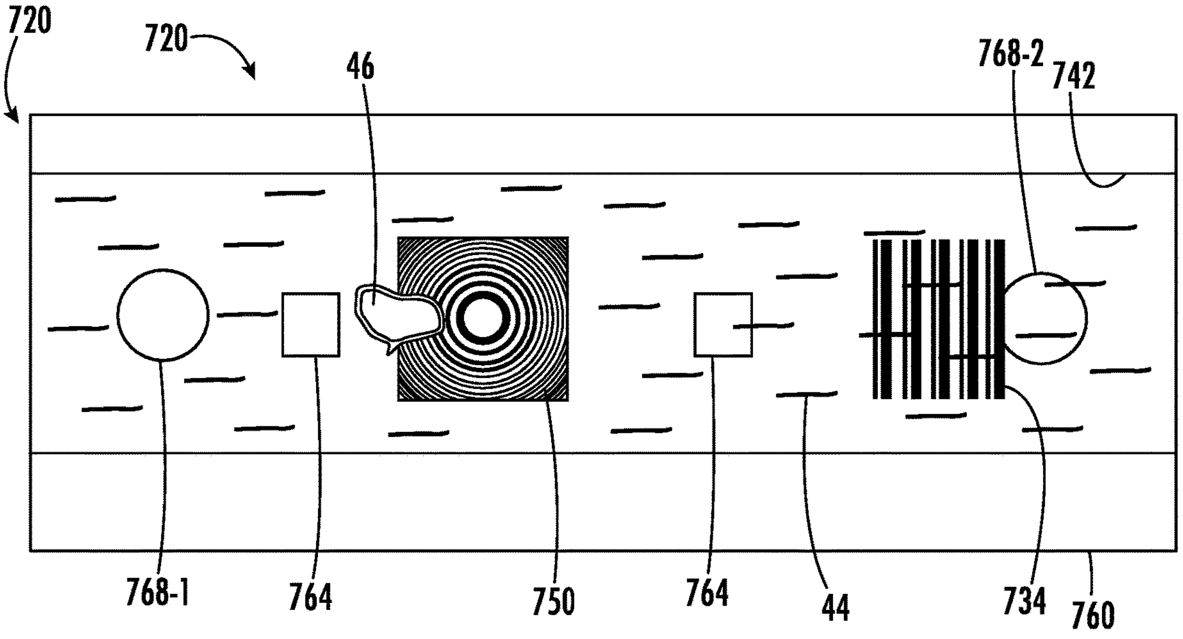
FIG. 8B is a sectional view of the microfluidic sensing assembly of FIG. 8A taken along line 8B-8B.

FIGS. 8A and 8B schematically illustrate portions of an example microfluidic sensing assembly 720. FIG. 8A is a sectional view of assembly 720. FIG. 8B is a sectional view of assembly 720 taken along line 8B-8B of FIG. 8A. FIGS. 8A and 8B illustrate an example of how an integrated assembly may internally reflect light within a microfluidic passage of a microfluidic unit and direct the reflected light to a flat lens which focuses light onto a sensing array to facilitate sensing of analyte fluidly suspended within the microfluidic unit. Microfluidic sensing assembly 720 comprises sensing unit 722 and microfluidic unit 724, which are joined by connection interfaces 746 (schematically represented), and controller 728.

Sensing unit 722 comprises packaging 730, spacer 731, sensor array 732 and optical filters 733. Packaging 730 and spacer 731 comprises layers of material that form a structure for integrating and supporting the remaining components of sensing unit 722. Packaging 730 partially encapsulates sensor array 732 to support sensor array 732. In the example illustrated, packaging 730 further supports light source 739. In some implementations, packaging 730 comprises a molding, such as an epoxy mold compound. In some implementations, packaging 730 may comprise a circuit chip or a printed circuit board upon which sensor array 732 is formed. Packaging 730 may contain or support electrically conductive traces, switches (transistors) and other circuit componentry for communicating with and controlling sensor array 732 and light source 739.

Spacer 731 comprises a layer or multiple layers of material which space the individual sensing elements 735 of sensor array 732 from the flat lens 750 of microfluidic unit 724. Spacer 731 further supports optical filters 733 across from an opposite to the sensing element 735 of sensor array 732 and light source 739. Spacer 731 further serves to isolate stray light and isolate adjacent channels. In some implementations, spacer 731 comprises a baffle or other structure mounted to package 730. In some implementations, spacer 731 comprises a molding, such as an epoxy mold compound, molded or patterned prior to being cured or solidified.

Sensor array 732 is similar to sensor array 32 described above. Sensor array 732 comprises an array of sensors from outputting electrical signals in response to and based light impinging sensor array 732. Sensor array 732 may be utilized for spectrometry or imaging. In some implementations, sensor array 732 comprises a two-dimensional array of imaging elements, each element outputting electrical signals based upon and in response to the impingement of light upon such elements. In some implementations, each of the imaging or sensing elements of sensor array 732 may each comprise a complementary metal-oxide-semiconductor (CMOS), a charge coupled device (CCD) sensor element, a photodiode (PiN), photo-resistive sensor element or other types of a sensing element.

Optical filters 733 comprise optical components, such as absorption filters, dichroic filters, interference filters, partially reflective coatings, filter masks and the like, which further filter light being directed to sensor array 732. Such filters may be supported by the spacer, the packaging or assembled directly on the sensor array or source. Such filters may block selected wavelengths of light depending upon the characteristics of the sensing element 735, the analyte and the light being supplied by light source 739. In some implementations, optical filters 733 may comprise layers of light absorbing materials, metal oxides layers, multi-layer coatings as in dichroic filters, nanostructured coatings, anti-reflection coatings.

Light source 739 serves as an illumination source for providing light which is transmitted and reflected within a microfluidic passage of microfluidic unit 724. In some implementations, light source 239 comprises a light-emitting diode or multiple light emitting diodes. In some implementations, light source 739 may comprise a laser diode for monochromatic imaging/detection to reduce effects of chromatic aberrations off axis of the optical system. In other implementations light source 239 may comprise other illumination or lighting sources like organic light emitting diodes (OLEDs), vertical cavity surface emitting laser (VCSEL) and the like.

Microfluidic unit 724 forms a microfluidic passage 742 for directing the flow of fluid 44 in which an analyte 46 being sensed or imaged may be suspended. Microfluidic unit 724 comprises substrate 760, channel layer 762, fluid actuators 764, light coupler 734, reflective layers 766-1, 766-2 (collectively referred to as reflective surfaces 766) and flat lens 750. Substrate 760 and channel layer 762 cooperate to form microfluidic passage 742. Substrate 760 supports fluid actuators 764 and reflective layer 766-1. Substrate 760 forms ports 768-1 and 768-2 (collectively referred to as ports 768) through which fluid may enter and exit microfluidic passage 742. In some implementations, such ports 768 may be integrated into other fluidics architectures. In some implementations, substrate 760 comprises silicon, glass, ceramics, polymers are the like. In some implementations, substrate 760 may comprise a microfluidic die, circuit board or chip.

Channel layer 762 comprises multiple layers formed upon substrate 760. Channel layer 762 supports light coupler 734 and flat lens 750. Channel layer 762 comprises portions that are optically transparent to the light provided by light source 739. In some implementations, channel layer 762 comprises a photo-imageable epoxy which is patterned upon substrate 760. In some implementations, channel layer 762 comprises SU8. In other implementations, channel layer 762 may be formed from other materials.

Fluid actuators 764 comprise devices situated along microfluidic passage 742 to drive the movement of fluid 44 along microfluidic passage 742. In the example illustrated, each of fluid actuators 764 comprises an inertial pump formed by a thermal resistor, wherein upon being supplied with electrical current, the thermal resistor heats adjacent fluid to nucleate the adjacent fluid and create a bubble in microfluidic passage 742 which drives fluid along microfluidic passage 742. As shown by FIG. 8A, microfluidic unit 724 comprises two spaced fluid actuators 764, wherein the fluid actuators 764 may be individually and selectively actuated or powered to drive fluid 44 in either direction along microfluidic passage 742. In some implementations, a single fluid actuator 764 or additional fluid actuators 764 may be provided. In some implementations, the thermal resistors serving as fluid actuators 764 may be controlled Seth to generate non-nucleating temperatures to heat the fluid within microfluidic passage 7424 procedures such as PCR. In some implementations, fluid actuators 764 may be omitted.

Reflective layers 766 comprise layers of reflective material located on opposite sides of microfluidic passage 742 to internally reflect light from light source 739, received through light coupler 734, back and forth across microfluidic passage 742. Reflective layer 766-1 is formed on substrate 760 adjacent to microfluidic passage 742. Reflective layer 766-2 is formed upon channel layer 762, with portions of channel layer 762 sandwiched between reflective layer 766-2 and microfluidic passage 742. Reflective layer 766-2 comprises an opening 770 for light coupler 734 and an opening 772 for flat lens 750. In the example illustrated, reflective layer 766-2 is coplanar with light coupler 734 and flat lens 750 such that layer 766-2, light coupler 734 and flat lens 750 may be formed with fewer patterning processes.

Light coupler 734 is similar to light coupler 234 described above. Light coupler 734 is formed upon channel layer 762 within opening 770. Light coupler 734 is located to extend generally opposite to light source 739 when microfluidic unit 724 is joined to sensing unit 722 by connection interfaces 746.

Flat lens 750 is similar to flat lens 50 described above. Flat lens 750 is formed within opening 772 and is located to extend opposite to sensing elements 735 of sensor array 732 when microfluidic unit 724 is joined to sensing unit 722 by connection interfaces 746. Flat lens 750 focuses light, following a reflection of the light back and forth across microfluidic passage 742 and undergoing scattering from the fluid or analyte 46 suspended in the fluid, from microfluidic passage 742 onto sensor array 732.

Connection interfaces 746 join sensing unit 722 and microfluidic unit 724 such that light coupler 734 is aligned with light source 739 and such that flat lens 750 is generally aligned with the sensor elements 735 of sensor array 732. In some implementations, connection interfaces 746 permanently affix units 722 and 724 to one another. For example, in some implementations, connection interfaces 724/726 may comprise an adhesive, weld, bond or the like. In some implementations, connection interfaces 746 releasably or removably connect units 722 and 724 in an aligned state. For example, although schematically illustrated in FIG. 8A, connection interfaces 746 may be similar to the connection interfaces illustrated in FIGS. 4A, 4B and 5. In some implementations, other forms of connection interfaces 746 may be employed.

Controller 728 controls the interrogation of a fluid sample. Controller 728 is in communication with sensor array 732, light source 739 and fluid actuator 764. In some implementations, controller 728 communicates in a wireless fashion with such components. In another implementation, controller 728 controls such components in a wired fashion. For example, in some implementations, connection interfaces 746 may further include electrical contact pads, electrically conductive pins and pin receptacles, plugs and sockets or the like, wherein the joining of units 722 and 724 electrically connects controller 728 to each of the above components. Controller 728 may be formed upon microfluidic unit 724 or unit 722.

Controller 728 comprise a processing unit 774 and a non-transitory computer-readable medium 776. Medium 776 contains instructions for directing processing unit 774 to carry out interrogation of the fluid 44 within microfluidic passage 742. Such instructions may further direct processing unit 774 to carry out the analysis of the data obtained from sensor array 732 resulting from the interrogation. To interrogate fluid 44, instructions contain in medium 776 may direct processing unit 774 to output control signals causing fluid actuator 764 to drive fluid 44 through microfluidic package 742. During such time, such instructions may further direct light source 739 to direct light into microfluidic passage 742, across light coupler 734. Such light is transmitted through transparent portions of channel layer 762 and is reflected back and forth across microfluidic passage 742 between reflective layers 766-1 and 766-2. During such internal reflection, light may impinge analyte 46 prior to being focused by flat lens 750 onto sensor array 732. The instructions contained medium 776 may direct processing unit 774 to analyze electrical signals received from sensor array 732 to identify or monitor the current state of analyte 46.

Figure 9:
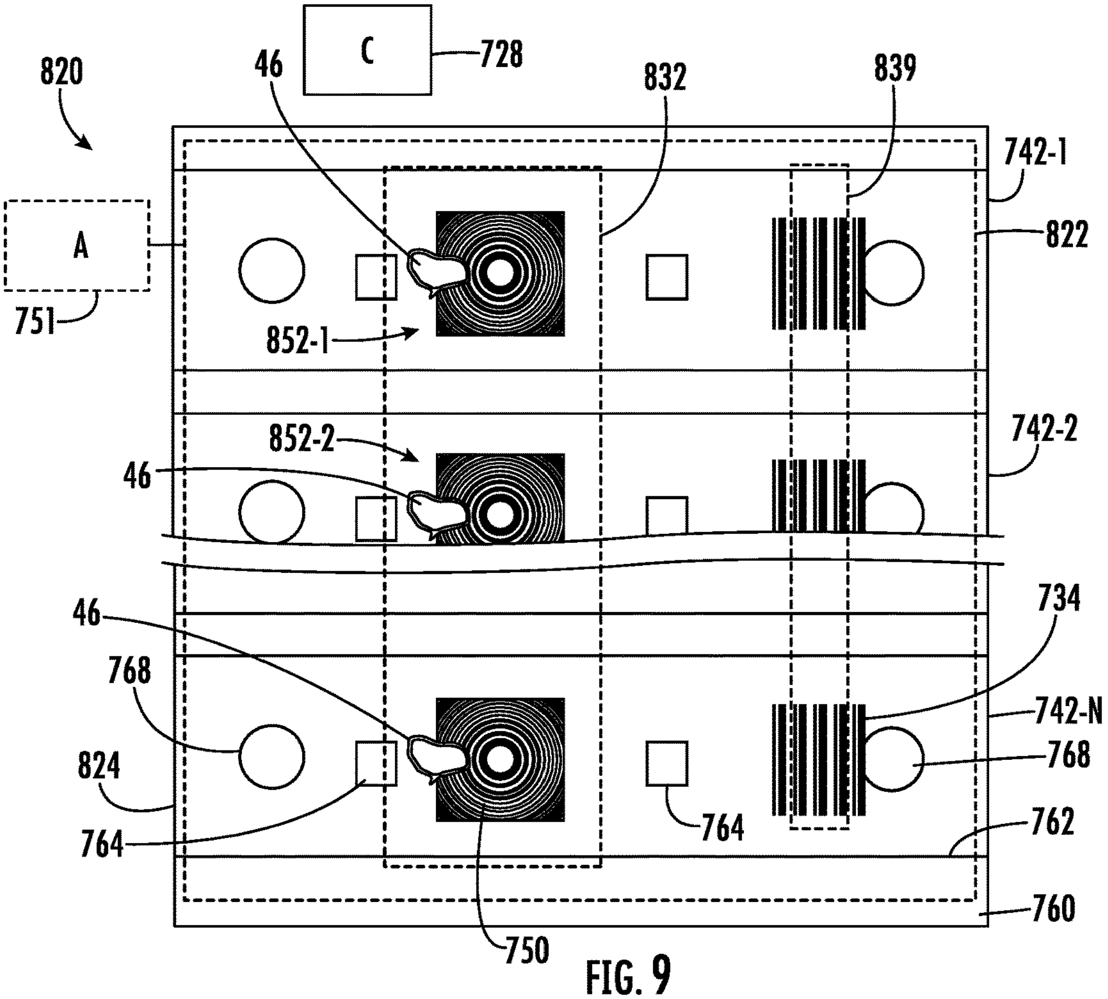
FIG. 9 is a sectional view schematically illustrating portions of an example microfluidic sensing assembly.

FIG. 9 schematically illustrates portions of an example microfluidic sensing assembly 820. FIG. 9 illustrates how a microfluidic sensing assembly may include multiple interrogation regions for illumination and sensing. Assembly 820 comprises sensing unit 822 (generally designated with broken lines), microfluidic unit 824 and controller 728 (described above). Those components of assembly 820 which correspond to components of assembly 720 described above are numbered similarly. Although not illustrated, units 822 and 824 are joined to one another by connection interfaces 746 (described above).

Sensing unit 822 is similar to sensing unit 722 described above except that sensing unit 822 comprises an elongate light source 839 dimensioned so as to extend opposite to multiple individual light couplers of microfluidic unit 824 and an elongate continuous sensor array 832 dimensioned us to extend across and opposite to multiple individual flat lenses and multiple sensing zones of microfluidic unit 824. Light source 839 and sensor 832 are both integrated and supported by a structure formed by package 730 and spacer 731 as described above. In some implementations, separate and distinct light sources 839 and/or separate and distinct sensor arrays 832 may be provided for each of the respective light couplers and sensing zones of microfluidic unit 824.

Microfluidic unit 824 is similar to microfluidic unit 724 described above except that substrate 760 and channel layer 762 cooperate to form multiple microfluidic passages 742-1, 742-2 . . . **742-*n* (collectively referred to as microfluidic passages 742), with each of passages 742 having its own set of fluid actuator 764, ports 768, light coupler 734 and flat lens 750. Microfluidic passages 742 provide multiple parallel sensing or imaging zones 852-1, 852-2 . . . 852-*n* (collectively referred to as zones 852). Controller 728** may output control signals to concurrently or sequentially interrogate each of the sensing zones.

In some implementations, sensing unit 822 may comprise a light source 839 and a sensor array 732 sized for interrogating a portion of the total number of zones 852 at a time, wherein controller 728 may output control signals causing a movement actuator 751 (shown in broken lines) to physically move sensing unit 822 relative to microfluidic unit 824 to sequentially position the light source 739 and the sensor array 832 opposite to different microfluidic passages 742 such that the different sensing zones 852 may be sequentially interrogated. In some implementations, the movement actuator 751 may comprise an electric or pneumatic solenoid, a worm gear, a belt drive motor or the like for moving microfluidic sensing 822 relative to microfluidic unit 824. In one implementation where coupling interface 726 is similar to that shown in FIGS. 4A and 4B, movement actuator 751 may drive one or both of units 822 and/or 824 relative to one another by sliding tongue 260 within groove 262.

Figure 10:
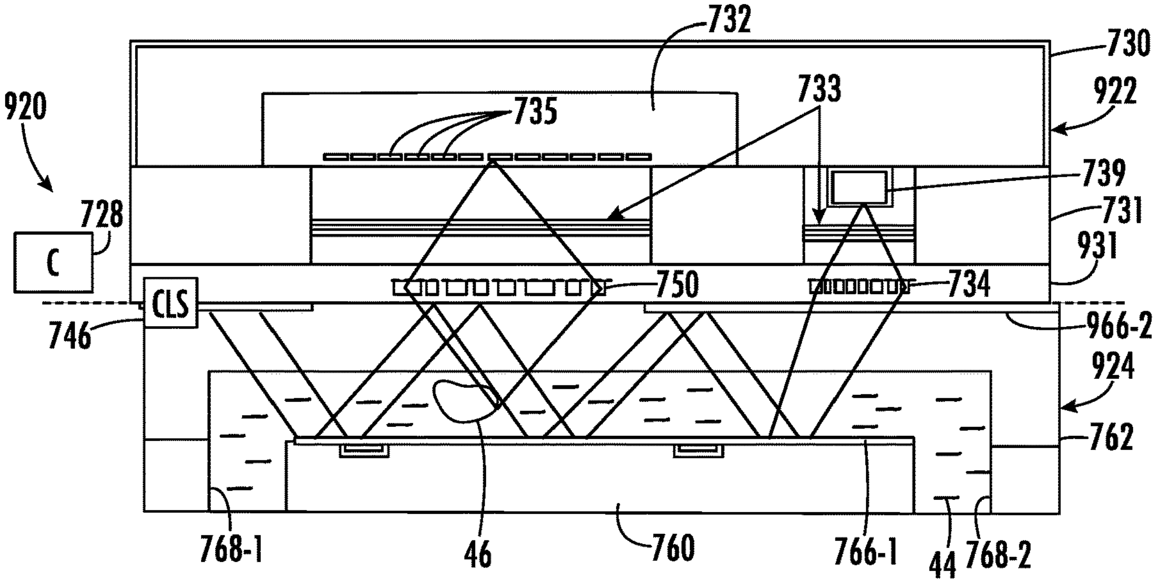
FIG. 10 is a sectional view schematically illustrating portions of an example microfluidic sensing assembly.

FIG. 10 is a sectional view schematically illustrating portions of an example microfluidic sensing assembly 920. FIG. 10 illustrates an example of how a light coupler and flat lens may be integrated as part of a sensing unit rather than as part of a microfluidic unit of an assembly. FIG. 10 further illustrates another example of how light may be internally reflected back and forth across a microfluidic passage. Microfluidic sensing assembly 920 comprises sensing unit 922 and microfluidic unit 924. Microfluidic sensing assembly 920 is similar to microfluidic sensing assembly 720 described above except that light coupler 734 and flat lens 750 are supported by a layer 931 which integrates light coupler 734 and flat lens 750 as part of microfluidic sensing 922 rather than as part of microfluidic unit 924. The remaining components of assembly 920 which correspond to points of assembly 720 are numbered similarly.

Layer 931 is supported by spacer 731, with spacer 731 being sandwiched between layer 931 and packaging 730. Layer 931 is transparent in those portions opposite to light coupler 734 and flat lens 750. In some implementations, light coupler 734 and flat lens 750 are formed on an exterior face of layer 931. Because light coupler 734 and flat lens 750 are formed upon the same layer, fabrication may be less costly and less complex. In the example illustrated, light coupler 734 and the flat lens 750 are coplanar. As a result, patterning of such lenses or optical elements may be carried out in fewer steps and may be less costly.

Microfluidic unit 924 is similar to microfluidic unit 824 described above except that microfluidic 94 does not include light coupler 734 or flat lens 750 and comprises a partially transmissive, partially reflective layer 966-2 in place of reflective layer 766-2. Partially transmissive, partially reflective layer 966-2 transmits the light from light source 739 at the higher angles of incidence while reflecting light that has been reflected across microfluidic passage 742 and through channel layer 762 due to the greater incident angles. Partially transmissive, partially reflective layer is aligned with and extends opposite to light coupler 734 when units 922 and 924 are joined to one another. In one implementation, the partially transmissive, partially reflective layer 962 may comprise a layer or coating of a material such as metal coating, dielectric coating, nano-structured coatings and dichroic coatings made for example of metal oxide layer stacks with such elements as aluminum, silver, gold, and the like.

Figure 11:
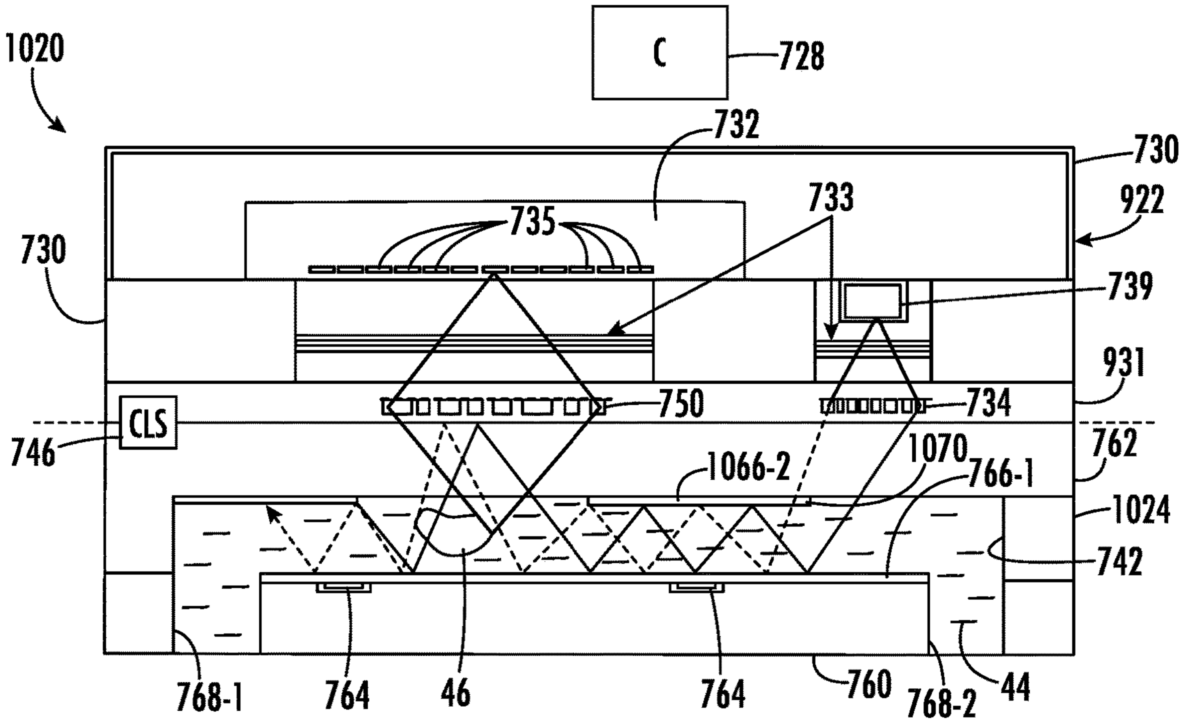
FIG. 11 is a sectional view schematically illustrating portions of an example microfluidic sensing assembly.

FIG. 11 is a sectional view schematically illustrating portions of an example microfluidic sensing assembly 1020. FIG. 11 illustrates an example of how light may be internally reflected within a microfluidic passage, back and forth across the microfluidic passage, prior to being emitted towards a flat lens which focuses light onto a sensor array. Microfluidic sensing assembly 1020 comprises sensing unit 922 (described above) and microfluidic unit 1024 which is joined to sensing unit 922 by connection interfaces 746. Those components of assembly 1020 which correspond to components of assembly 720 or 920 are numbered similarly.

Microfluidic unit 1024 is similar to microfluidic unit 924 except that unit 1024 comprises reflective layer 1066-2 in place of layer 966-2. Reflective layer 1066-2 comprises a coating or layer of reflective material formed upon the interior surfaces of microfluidic passage 742 opposite to reflective layer 766-1. Reflective layer 1066-2 is not coated or provided on those portions of channel layer 762 so as to form a first opening 1070 through which light from light source 739 and passing through light coupler 734 may pass into microfluidic passage 742. Reflective layer 1066-2 is further not coated upon are not provided upon those portions of channel layer 762 through which light may be directed through channel layer 762 to flat lens 750. As shown by FIG. 11, light is contained within microfluidic passage 742 once the light has entered microfluidic passage 742 and until the light exits microfluidic passage 742 towards flat lens 750.

Figure 12:
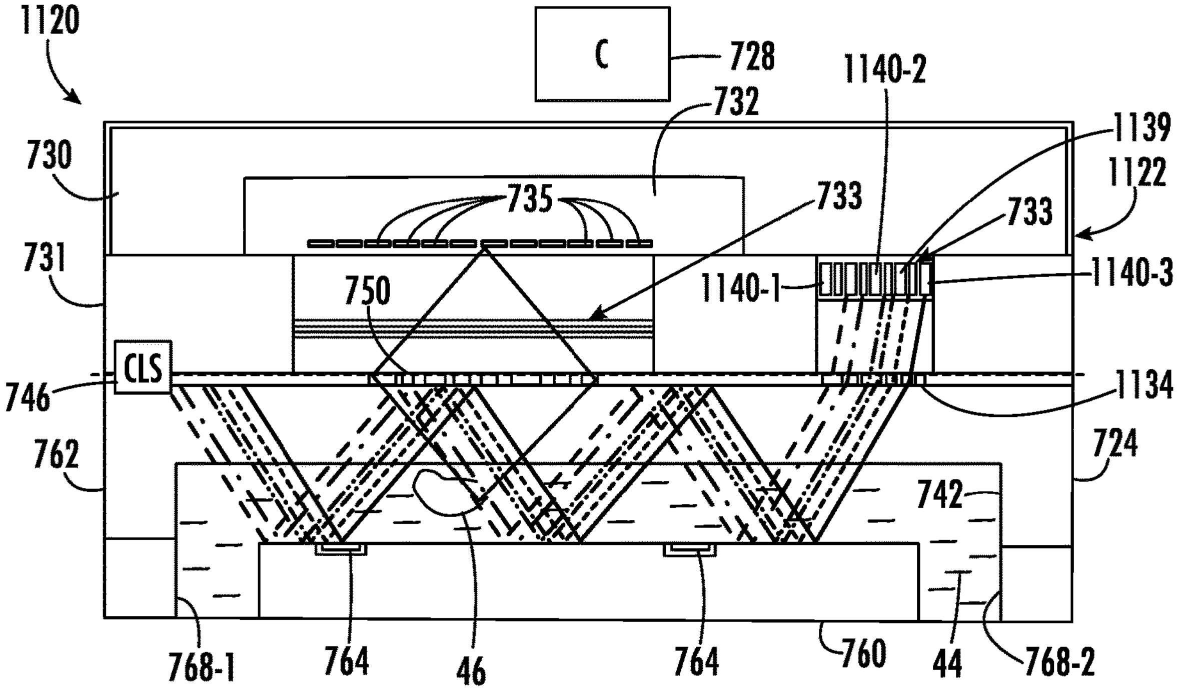
FIG. 12 is a sectional view schematically illustrating portions of an example microfluidic sensing assembly.

FIG. 12 is a sectional view illustrated portions of an example microfluidic sensing assembly 1120. FIG. 12 illustrates an example of how the above described assemblies may be modified for spectrometry. Microfluidic sensing assembly 1120 is similar to microfluidic sensing assembly 720 as described above except that microfluidic sensing assembly 1120 comprises sensing unit 1122 in place of sensing unit 722. Those remaining components of microfluidic sensing assembly 1120 which correspond to components of microfluidic sensing assembly 720 are numbered similarly.

Sensing unit 1122 is itself similar to sensing unit 722 except that sensing unit 1122 comprises an array 1139 of a polychromatic light emitting elements and diffraction light coupler 1134 in place of light source 739 and light coupler 734, respectively. The diffraction light coupler 1134 transmits different wavelengths of light to microfluidic passage 742 depending upon the angle of incidence of the polychromatic light impinging the diffraction coupler 1134. By selectively controlling or turning on and off individual polychromatic light emitting elements of the array 1139, controller 728 may vary and control the wavelength of light being directed to microfluidic passage 742.

As shown in FIG. 12, controller 728 may selectively actuate or turn on the first emitter 1140-1. Due to the angle of incidence of the polychromatic light, emitted by emitter 1140, with respect to diffraction grating 1134, a first wavelength of light is directed along microfluidic passage 742. At a second time, controller 728 may turn on second different emitter 1140-2. Due to the different angle of incidence of the polychromatic light, emitted by emitter 1140-2, upon diffraction coupler 1134, a second wavelength of light, different than the first wavelength of light, will be directed along microfluidic passage 742. At yet a third time, controller 728 may turn on a third different emitter 1140-3. Due to the third angle of incidence of the polychromatic light from emitter 1140-3 with respect to diffraction coupler 1134, a third wavelength of light, different than the first and second wavelengths of light, is directed along microfluidic passage 742. As a result, by selectively turning on and off different emitters 1140 of array 1139, controller 728 may analyze different responses of the analyte 46 to different wavelengths of light using the signals from sensor array 732. In yet other implementations, assembly 1120 may provide spectrometry where assembly 1120 comprises a light source that controllably emits different wavelengths of light (different monochromatic lights) in place of array 1139, and where diffraction coupler 1134 is replaced with any of the above described light couplers or is omitted. Such spectrometry may be used for fluorescent and absorption spectroscopy.

Although the present disclosure has been described with reference to example implementations, workers skilled in the art will recognize that changes may be made in form and detail without departing from the disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A microfluidic sensing assembly comprising:

a first structure supporting a sensor array;

a second structure joined to the first structure, the second structure forming a microfluidic passage comprising a reflective material on opposing sides of the microfluidic passage;

a flat lens on a side of the microfluidic passage to focus light, following reflection of the light back and forth across the microfluidic passage, from the microfluidic passage onto the sensor array; and a light coupler positioned and configured to direct the light at a portion of the microfluidic passage such that the light reflect off of the reflective material on each of the opposing sides at least once prior to reaching the flat lens.

2. The microfluidic sensing assembly of claim 1 further comprising the light coupler on the side of the microfluidic passage to receive and direct the light into the microfluidic passage.

3. The microfluidic sensing assembly of claim 2, when the second structure comprises a layer upon which both the light coupler and the flat lens are supported.

4. The microfluidic sensing assembly of claim 3, wherein the layer comprises a photo-imageable epoxy.

5. The microfluidic sensing assembly of claim 3, wherein the light coupler and the flat lens are coplanar.

6. The microfluidic sensing assembly of claim 1, wherein the first structure supports the flat lens.

7. The microfluidic sensing assembly of claim 6, wherein the first structure supports the light coupler.

8. The microfluidic sensing assembly of claim 1 further comprising the light coupler, wherein the second structure supports the light coupler.

9. The microfluidic sensing assembly of claim 1, wherein the first structure is releasably joined to the second structure and wherein the first structure supports the flat lens and the light coupler.

10. The microfluidic sensing assembly of claim 1, wherein the first structure supports the light coupler and where the second structure supports the flat lens.

11. The microfluidic sensing assembly of claim 1 further comprising a fluid actuator supported by the second structure along the microfluidic passage.

* * * * *